United States Patent Office 3,188,887
Patented June 15, 1965

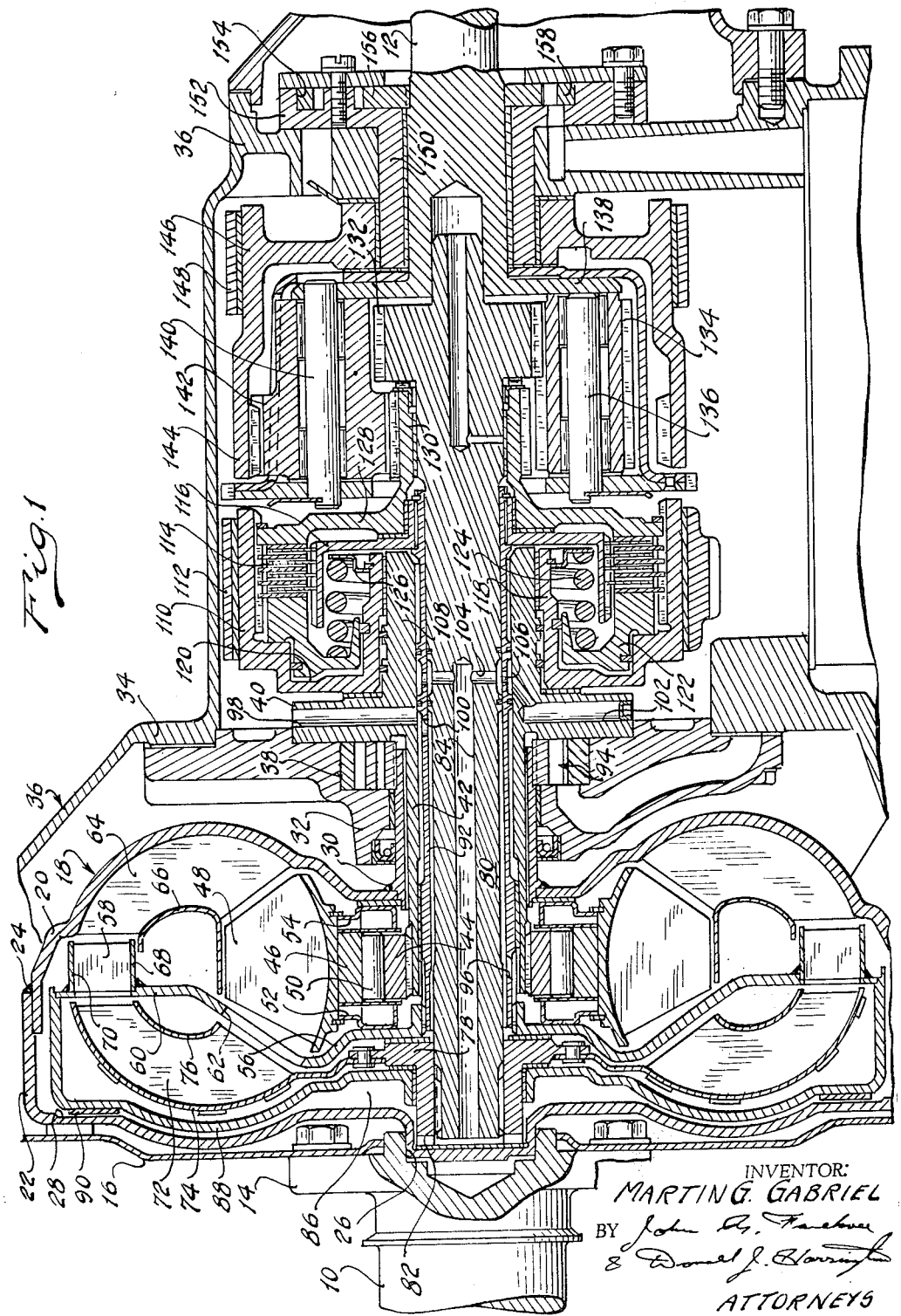

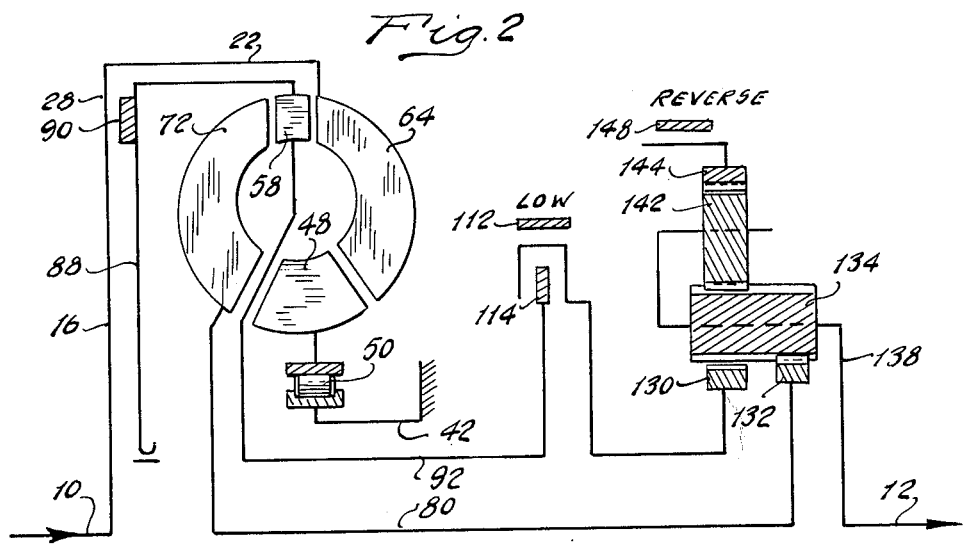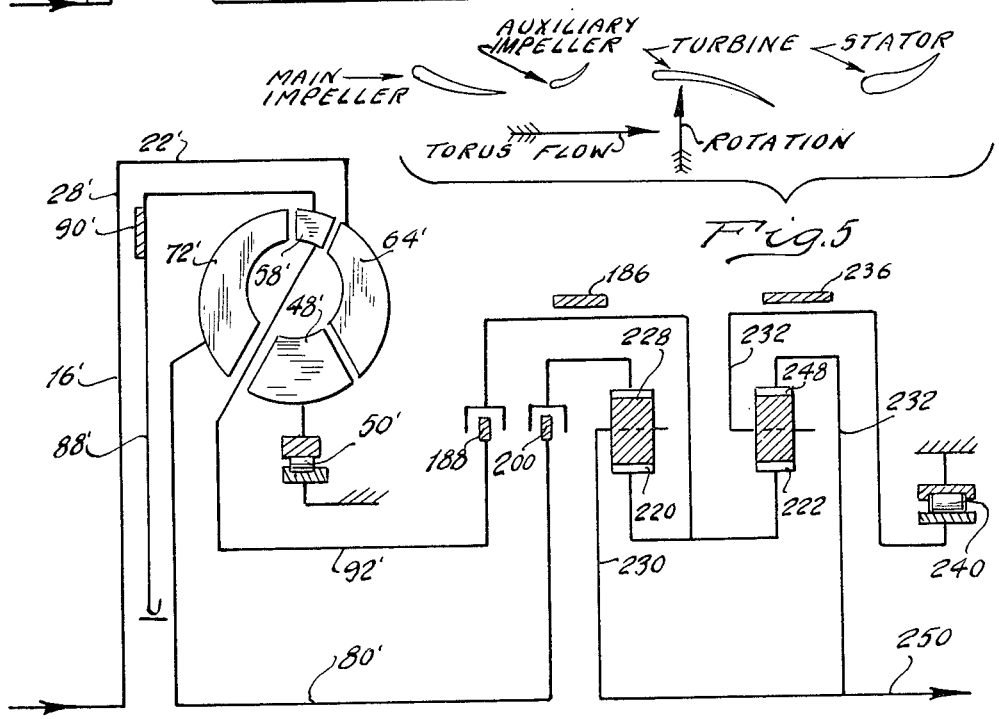

3,188,887
HYDROKINETIC POWER TRANSMISSION MECHANISM
Martin G. Gabriel, Dearborn, Mich., assignor to Ford Motor Company, Dearborn, Mich., a corporation of Delaware
Filed Dec. 26, 1962, Ser. No. 247,222
10 Claims. (Cl. 74—688)

My invention relates generally to hydrokinetic power transmission mechanisms, and more particularly to a transmission mechanism having a dual range torque converter and torque transmitting gear elements acting in cooperation.

My invention is adapted particularly to be used in automotive vehicle drive lines, and it is capable of providing a maximum performance, high acceleration driving range and a maximum efficiency cruising range.

It is an object of my invention to provide a dual range torque converter and a gear mechanism wherein the power input element of the gear unit is connected to a turbine member of the hydrokinetic torque converter, and wherein the operating characteristics of the torque converter can be controlled to provide optimum cruising performance under steady state road load conditions and also high torque ratio performance under accelerating conditions.

It is a further object of my invention to provide a torque converter mechanism and a gear combination wherein an auxiliary impeller is situated in the torus flow circuit of the converter mechanism, the turbine of the torque converter mechanism being connected to a power input element of the gear unit.

It is a further object of my invention to provide a transmission mechanism of the type above set forth wherein clutch and brake structure is provided for controlling the relative motion of the elements of the gear unit and for providing the necessary driving torque reaction during both forward and reverse operation.

It is a further object of my invention to provide a transmission mechanism of the type above set forth wherein the auxiliary impeller is connected drivably to the gear units through a selectively engageable friction clutch thus providing a split torque delivery path from the power input member to the driven member of the mechanism.

It is a further object of my invention to provide a dual range torque converter and gear combination, said converter mechanism including an auxiliary impeller and a main impeller wherein the influence of the auxiliary impeller can be controlled to establish selectively either high torque ratio performance or cruising performance in the low gear ratio condition when accelerating from a standing start.

It is a further object of my invention to provide a mechanism of the type above set forth wherein the clutch and brake structure is adapted to condition the gear mechanism for at least two forward driving speed ratios and a single reverse speed ratio.

For purposes of describing particularly my invention, reference will be made to two alternate embodiments that are illustrated in the accompanying drawings, wherein:

FIGURE 1 shows in cross sectional form a two-speed transmission assembly employing a dual range torque converter;

FIGURE 2 is a schematic representation of the transmission structure of FIGURE 1;

FIGURE 4 is a schematic representation of the transmission structure of FIGURE 3; and FIGURE 5 is a schematic representation of the flow directing blades of the dual range torque converter showing the relative blade geometry.

Figure 3:
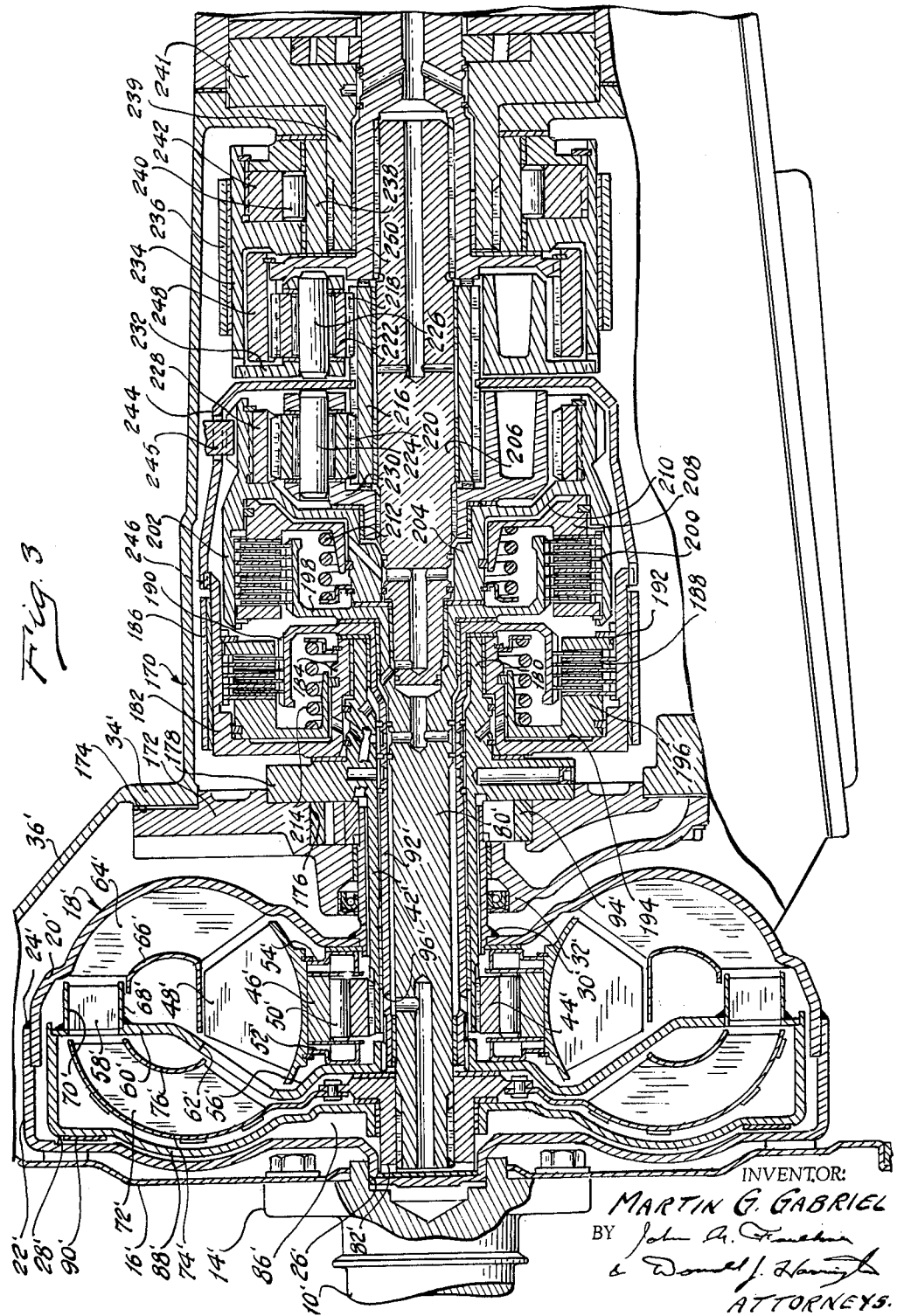
FIGURE 3 is a cross sectional view of an alternate embodiment of my invention which includes a three-speed gear unit having two clutches and two brakes for obtaining three forward driving gear ratios and a reverse gear ratio in combination with a dual range torque converter.

Referring first to FIGURES 1 and 2, numeral 10 designates an engine driven power input shaft which usually is in the form of an engine crankshaft for a reciprocating piston internal combustion engine. Numeral 12 designates a power output or driven shaft and may be connected drivably to the vehicle traction wheels.

Shaft 10 can be flanged at 14 to accommodate a bolted connection with a drive plate 16 which can be bolted or otherwise secured to an impeller shell 18. The impeller shell comprises two parts 20 and 22 which may be welded together as shown at 24. The radially inward region of part 22 is received within a pilot recess 26 in the crankshaft 10. The radially outward portion of the part 22 is formed with a radial friction surface 28 which is a part of the clutch structure subsequently to be described.

The radially inward portion of impeller shell part 20 is secured to a sleeve shaft 30 which is journaled within a cooperating opening formed in wall 32. This wall is secured about the outer periphery to a boss 34 formed on the transmission housing 36.

Wall 32 forms also a pump cavity 38 within which positive displacement pump elements are housed. These elements form a part of a transmission control pump adapted to supply an automatic control valve circuit that in turn controls the clutch and brake structure subsequently to be described.

The pump cavity 38 is closed by a stationary adaptor 40 on which is formed an extension sleeve shaft 42 positioned within the impeller sleeve shaft 30.

The inner race 44 of an overrunning brake is splined to sleeve shaft support 42. The cooperating outer race 46 is carried by a bladed torque converter reactor member 48, the hub of reactor member 48 being centrally bored to accommodate the race 46.

Clutch rollers 50 are situated between the races 44 and 46 and they cooperate with cammed surfaces formed on one of these races to permit overrunning motion of the bladed stator 48 in one direction, while inhibiting motion thereof in the opposite direction. Thrust members 52 and 54 are situated on either side of the races 44 and 46, the thrust member 54 acting against a bushing that in turn engages the inner hub portion of impeller shell part 20. The thrust member 52 engages a hub member 56 for a bladed auxiliary impeller 58. This impeller is carried by supporting fingers 60 which are connected to the hub portion 56. They are apertured, as shown at 62, to permit uninhibited fluid circulation in the torus circuit.

The auxiliary impeller 58 is situated at the exit section of a bladed main impeller 64 carried by the impeller shell part 20. Impeller 64 is defined by a plurality of impeller blades and by a circular inner shroud 66. The bladed auxiliary impeller 58 is formed also with shrouds that cooperate with the blades to define torus flow passages, an inner shroud being identified by reference character 68 and an outer shroud being shown at 70.

A bladed turbine is identified by reference character 72 and includes turbine blades disposed between an outer turbine shroud 74 and an inner turbine shroud 76. The inlet section for turbine 72 is situated at the exit section of auxiliary impeller 58 at the radially outward region of the circuit, and the outlet section of the turbine 72 is situated at the radially inward region adjacent the inlet section of the bladed reactor or stator 48.

The outer shroud 74 of the turbine 72 is positively connected to a turbine hub 78 that in turn is splined to a centrally disposed turbine shaft 80. The left-hand axial end of hub 78 is recessed as shown at 82 to permit fluid communication between a central passage 84 and a pressure chamber situated on the interior of impeller shell part 22. This pressure chamber is identified by reference character 86.

The auxiliary impeller 58 is carried by a supporting member, hereinafter referred to as an auxiliary clutch member. This clutch member is identified by reference character 88. It is piloted at its hub upon the hub member 78 by means of a suitable bushing. The reaction force acting upon hub 56 and the thrust forces acting upon thrust member 52 are transferred through the hub member 78 to the hub shell part 22 as indicated.

The member 88 carries at its outer periphery a friction disc 90 that has a friction surface adapted to engage frictionally the clutch friction surface 28 of the impeller shell part 22. This member 88 cooperates with shell part 22 to define the aforementioned pressure cavity 86.

The hub 56 for the auxiliary impeller support is splined to a sleeve shaft 92 situated in concentric relationship with respect to turbine shaft 80.

Fluid pressure is supplied to the torus circuit of the torque converter through the annular space defined by the sleeve shafts 30 and 42. This fluid is in communication with a regulator valve mechanism that is supplied by the exit port of a pump, generally identified by reference numeral 94, which is situated in the pump cavity 38.

Fluid is returned from the torus circuit through a port 96 in the sleeve shaft 92 and then is conducted through the annular space defined by sleeve shaft 92 and turbine shaft 80. It then is returned to a low pressure exhaust passage 98 through a port 100 formed in sleeve shaft 92.

The pressure cavity 86 communicates with the central passage 84 as previously indicated. It also communicates with the interior of the converter torus cavity through the restricted annular passage defined by the adjacent friction surfaces 28 and 90. This passage in turn communicates with a passage 102 through a radial passage 104 formed in the turbine shaft 80. A cooperating port 106 is formed in sleeve shaft 92 for this purpose.

If passage 102 is pressurized by suitable valve structure, not shown, the pressure chamber 86 will be pressurized similarly. This pressure may be made to balance the counteracting pressure acting on the inner side of the auxiliary impeller clutch member 88 by reason of the circuit pressure in the torque converter. If the pressure in chamber 86 is reduced or exhausted, clutch disc 90 is brought into frictional engagement with clutch surface 28. Under these conditions, the pressure drop due to the radially inward flow across the surfaces 28 and 90, which accompanies a reduction in the pressure in chamber 86 relative to the torus circuit pressure, creates a clutch engaging force. The total clutch engaging force equals the pressure differential across the member 88 multiplied by the effective area of the member 88. By preference, the support fingers 60 for the auxiliary impeller 58 can be made flexible to permit a slight degree of axial movement of the auxiliary impeller 58 and the member 88. In the alternative, the member 88 can be made shiftable with respect to the auxiliary impeller 58 to accomplish the clutching action for the auxiliary impeller clutch. The splined connection between sleeve shaft 92 and hub 56 can be made to accommodate this shifting movement.

If the auxiliary impeller clutch defined by disc 90 and friction surface 28 is engaged, the auxiliary impeller 58 will rotate in unison with the main impeller 64 so that the combined effect is similar to that of a single stage impeller. If the clutch structure 90 and 28 is disengaged, however, the auxiliary impeller 58 will float freely in the torus circuit and the entire torus flow will be established by the main impeller 64 acting alone.

Referring next to FIGURE 5, I have illustrated diagrammatically the relative blade geometry of the main impeller, the auxiliary impeller, the turbine and the stator.

It will be apparent from an inspection of FIGURE 5 that the blade exit angle for the main impeller extends generally in a backward direction relative to the direction of rotation. The angularity of the auxiliary impeller, however, is such that the fluid flow direction is diverted relative to the main impeller in a direction that corresponds to the direction of rotation. As the flow reaches the turbine, the direction of rotation in the torus circuit is reversed thereby imparting a hydrodynamic thrust upon the turbine. As the fluid leaves the turbine exit, its direction is reversed again by the stator.

If we consider for the moment the absolute fluid flow velocity vector (e.g., the vector sum of the torus flow, the rotation vector and the fluid flow velocity vector along the blade), the magnitude of the tangential component for this vector measured in the direction of rotation increases as the flow passes through the main impeller and the auxiliary impeller blades. Its magnitude decreases, of course, as the fluid passes through the turbine blade. But the tangential component of the absolute fluid flow velocity vector again increases in magnitude as the flow passes through the stator. This produces a reverse torque reaction upon the stator, but the overrunning brake shown in part at 46, 50 and 44 inhibits reverse rotation of the stator. Thus, torque multiplication is experienced during operation of the converter mechanism in the torque multiplication range.

The torque converter size factor, which is measured by the engine speed divided by the square root of the main impeller torque, increases if the auxiliary impeller clutch structure is disengaged. Likewise, the torque ratio of the converter mechanism is increased. During operation in the coupling range of the converter, however, the angularity of the main impeller is not that value which would be considered optimum for maximum efficiency. But the effective angle can be changed by engaging the auxiliary impeller clutch thus providing impeller blade geometry that is favorable to high efficiency cruising operation. The angle of the auxiliary impeller, however, does not favor high torque ratio, low speed ratio operation.

For a more complete analysis of the hydrokinetics involved, reference may be made to my copending application Serial No. 235,413, filed November 5, 1962.

Referring again to FIGURE 1, the member 40 has formed thereon an extension 108 that supports a brake drum 110. Suitable bushings may be provided as shown. A brake band 112 surrounds drum 110 and may be actuated by suitable servo structure, not shown, to anchor selectively brake drum 110. The interior of drum 110 is splined to facilitate a driving connection with externally splined clutch discs of a multiple disc clutch assembly 114. Internally splined discs of clutch disc assembly 114 are carried by an externally splined clutch member 116 that in turn is splined or otherwise positively secured to sleeve shaft 92, which is connected to the auxiliary impeller.

Clutch drum 110 is formed with a hub 118 which cooperates with the drum proper to define an annular clutch pressure chamber 120. An annular piston 122 is situated within the chamber 120 and it is biased normally to an inactive position by a clutch return spring 124. Spring 124 may be anchored by a spring seat 126 secured to the hub of drum 110 by a suitable snap ring.

A clutch member 128 is drivably connected to drum 110 and a small sun gear 130 is connected thereto as shown. A relatively large sun gear 132 is disposed adjacent sun gear 130, and it continuously engages a set of long pinions 134 which are carried by pinion shafts 136. Each shaft 136 in turn is supported by a carrier 138 which is connected to the power output shaft 12. The carrier 138 supports also pinion shafts 140 upon which are journaled a series of short planet pinions 142. These pinions 142 engage sun gear 130 and also pinions 134.

A ring gear is shown at 144, and it also drivably engages short pinions 142. Ring gear 144 is carried by a brake drum 146 about which is positioned a friction brake band 148 that may be engaged selectively by a suitable brake operating servo, not shown.

Drum 146 in turn is journaled upon a stationary support sleeve 150 carried by an end wall 152. This wall 152 is secured to the end of housing 36. It defines also a pump cavity 154 within which positive displacement elements 156 and 158 are situated. Pumping element 156 can be keyed or otherwise drivably connected to power output shaft 12. This pump also forms a part of an automatic control valve circuit for controlling the engagement of the clutch disc assembly 114 and the brakes 112 and 148 to accomplish the various speed ratio shifts. This same valve circuit, of course, can be used to control distribution and exhaust of pressure from the auxiliary pump cavity 86.

To establish low speed ratio, high torque multiplication operation, brake band 112 can be applied. This anchors sun gear 130. If we assume that the auxiliary impeller clutch is disengaged, turbine torque is delivered to shaft 80 with the highest torque converter torque ratio. Shaft 80 drives sun gear 132. This drives pinion 134 in a reverse direction and pinion 134 in turn drives pinion 142 in a forward direction. Since sun gear 130 serves as a reaction member, the carrier 138 and the power output shaft 12 are driven at a reduced speed ratio.

To establish direct drive high speed ratio operation, the brake band 112 can be disengaged and the multiple disc clutch assembly 114 can be applied. This establishes cruising operation. The characteristics of the converter can be chosen so that the converter will have attained its coupling range under these conditions. Thus, the sun gears 130 and 132 are locked together by the combined action of the multiple disc clutch assembly 114 and the coupling action of the torque converter bladed members. If optimum cruising operation is desired, the auxiliary impeller clutch can be engaged at this time to improve the cruising efficiency. As previously explained, this would provide a more favorable effective impeller exit angle by reason of the angularity of the auxiliary impeller relative to the angularity of the main impeller blades.

If a cruise-start in low gear is desired, it merely is necessary to maintain the auxiliary impeller clutch in engagement as the brake band 112 is applied. While keeping the auxiliary impeller clutch applied, an upshift to the direct drive speed ratio range can be accomplished merely by disengaging brake band 112 and engaging the multiple disc clutch assembly 114 in timed sequence.

During operation in the low gear ratio with the brake band 112 applied, the auxiliary impeller 58 floats freely in the torus circuit. With the auxiliary impeller clutch applied, however, a split torque drive is accomplished during operation in the direct drive range (clutch disc assembly 114 is applied under these conditions). A portion of the engine torque is delivered through the bladed turbine and through turbine shaft 80 to the sun gear 132. The balance of the input torque is distributed directly from the auxiliary impeller shell through fingers 60, through auxiliary impeller hub 56, through sleeve shaft 92, and through the engaged multiple disc clutch assembly 114 to the sun gear 130. This split torque feature greatly improves the shift quality upon an upshift since a portion of the torque is delivered through a hydrokinetic clutch in the form of impellers 64 and 58 and turbine 72.

To accomplish reverse drive operation, brake band 148 can be engaged in the usual fashion. Ring gear 144 thus serves as a reaction member on the carrier 138 and the power output shaft 12 thus will be driven in a reverse direction.

Referring next to FIGURE 3, I have shown an alternate embodiment of my invention which incorporates a three speed ratio gear box rather than a two speed ratio gear box as in FIGURE 1. The hydrokinetic portions of the structure of FIGURE 3 may be identical to the corresponding structure of FIGURE 1, and for this reason similar reference characters have been employed, although primed notations have been applied to the hydrokinetic mechanism of FIGURE 3 to distinguish its parts from the structure of FIGURE 1. For this reason, a description of the hydrokinetic portion of the mechanism of FIGURE 3 will be unnecessary.

In the mechanism of FIGURE 3, numeral 170 designates generally a unitary transmission housing that may correspond to the housing 36 of the embodiment of FIGURE 1. A separating wall 172 divides the hydrokinetic portion of the structure from the clutch and brake structure and from the gear mechanism. Wall 172 is secured about its periphery to a boss 174. It defines a pump chamber 176 which houses pumping elements corresponding to the pumping elements of pump 94 in the structure of FIGURE 1.

A support 178 is secured to wall 172 and is formed with an extension 180. A brake drum 182 is journaled upon extension 180, said drum 182 being formed with a hub portion 184 for this purpose. Disposed about the periphery of drum 182 is a friction brake band 186 which may be applied selectively to anchor the drum 182 and provide the necessary torque reaction during intermediate speed ratio operation, as will be explained subsequently.

The interior of drum 182 is splined internally to accommodate externally splined clutch discs of a multiple disc clutch assembly 188. Internally splined clutch discs of the assembly 188 are splined to a disc carrier member 190. A clutch disc back-up member 192 is carried by drum 182 and fixed against axial movement.

Drum 182 defines also a clutch pressure cavity 194 within which is situated an annular piston 196.

When the pressure chamber defined by piston 196 and the surrounding drum 182 is pressurized, the clutch discs of the assembly 188 are brought into frictional engagement thus establishing a driving connection between member 190 and the drum 182.

A second clutch disc carrier member is shown at 198. It is externally splined to accommodate a driving connection with internally splined clutch discs of a multiple disc clutch assembly 200. Externally splined clutch discs of the assembly 200 are splined to an internally splined clutch drum 202 disposed radially inwardly of the drum 182. Clutch drum 202 is formed with a hub 204 which is supported upon an intermediate shaft 206.

A turbine shaft 80' is connected directly to clutch member 198. The sleeve shaft 92' is connected to clutch member 190. Thus, when multiple disc clutch assembly 188 is engaged, a driving connection is established between drum 182 and sleeve shaft 92'. In a similar fashion, when the multiple disc clutch assembly 200 is engaged, a driving connection is established between turbine shaft 80' and clutch drum 202.

An annular piston 208 is situated within an annular cylinder 210 defined by the hub portion 204 and the surrounding clutch drum 202. Pressure may be applied to the clutch chamber defined by these parts to establish the aforementioned clutch engagement.

The clutch return spring 212 acts upon the annular piston 208 to return it to an inactive position as the clutch chamber 210 is exhausted. In a similar fashion, a piston return spring 214 is provided for the piston 196. Each spring 212 and 214 may be seated against a spring seat member that may be held against axial movement relative to the associated drum hub structure by a suitable snap ring.

The compound gear unit comprises a pair of sun gears 216 and 218. These sun gears engage drivably pinions 220 and 222, respectively. Pinions 220 are journaled upon pinion shaft 224 and pinions 222 are journaled upon pinion shaft 226. Pinions 220 engage a ring gear 228 carried by clutch drum 202 and are connected to shaft 80' when the multiple disc clutch assembly 200 is applied.

The pinion shafts 224 are carried by a carrier 230 which in turn is splined to shaft 206.

Pinion shafts 226 are carried by a carrier 232 which in turn is connected to a brake drum 234 about which is disposed a friction brake band 236. This band can be applied selectively by a suitable brake servo operator to anchor selectively the carrier 232.

Brake drum 234 is connected also to an inner race 238 for an overrunning brake shown in part at 240. This brake comprises a series of rollers situated between the race 238 and an outer race 242, the latter being cammed to inhibit rotation of the brake drum 234 in one direction. The rollers 240 supplement the braking action of the brake band 236 during forward drive operation.

Race 238 is splined to extension 239 formed on adaptor 241, which in turn is connected to an end wall of the housing 170. Adaptor 241 forms also a pump housing for a rear pump that forms a part of the automatic control system. It is driven by the driven shaft 250.

During hill brake operation and during reverse drive, brake band 236 may be applied to inhibit rotation of the carrier 232 in either direction.

Brake drum 182 is connected drivably to sun gears 216 and 218 through a drive shell 244. It may be keyed at 246 to the brake drum 182. The inner periphery of the drive shell 244 can be splined to the sun gears 216 and 218. A parking cog 245, carried by housing 170, can be provided as shown to lock shell 244 and gear 228 in a stationary condition.

The ring gear 248 engages pinions 222 and is carried by power output shaft 250. This shaft 250 is splined or otherwise positively connected to shaft 206. During forward drive operation, the multiple disc clutch assembly 200 is engaged. Under these conditions, turbine torque is delivered directly to ring gear 228. The sun gears 216 and 218 will tend to rotate in a reverse direction, and this reverse motion then imparts a forward driving torque to ring gear 248. The torque applied to ring gear 248 then tends to drive shaft 250 in a forward direction. The carrier torque acting upon carrier 230 is applied also to the shaft 250 thus establishing a split torque drive during low speed ratio operation.

The reaction torque, during operation in the low speed ratio range, is taken upon carrier 232 and is distributed to the casing through overrunning brake 240.

To establish intermediate speed ratio operation, brake 186 is applied. This anchors sun gears 216 and 218. Full turbine torque then is distributed to ring gear 228 and is multiplied by the front planetary gear set as the carrier 230 drives shaft 206, which in turn drives shaft 250.

Direct drive high speed ratio operation can be accomplished by disengaging brake 186 and engaging clutch disc assembly 188 in timed sequence. Thus, since both clutches 188 and clutch disc assembly 200 are engaged, the planetary gear unit is locked up for rotation in unison.

Reverse drive can be accomplished by engaging brake 236. Clutch disc assembly 200 is released and clutch disc assembly 188 is applied. Thus, if the auxiliary impeller clutch is applied, engine torque will be distributed directly through the clutch disc assembly 188 to the sun gears 216 and 218. This causes the ring gear 248 and the power output shaft 250 to rotate in a reverse direction with the carrier 232 functioning as a reaction member.

During forward drive, high performance operation can be accomplished by releasing the auxiliary impeller clutch. This conditions the torque converter mechanism for operation with an increased torque ratio and size factor. The magnified turbine torque then is distributed to the power input ring gear 228 of the gear unit. A low gear cruise-start can be obtained, however, merely by applying the auxiliary impeller clutch under these conditions, the carrier 232 functioning as a reaction member in this case also. If desired, the clutch can remain applied during intermediate speed ratio operation, but its advantages are realized more fully during cruising operation with both disc clutch assemblies 188 and 200 applied. This establishes maximum efficiency cruising operation for the transmission mechanism as a whole.

As in the embodiment of FIGURE 1, the upshift characteristics of the transmission mechanism are greatly improved, and harshness is reduced to a minimum degree by reason of the fact that a locked-up condition takes place in part through the hydrokinetic clutching action of the two impellers and the hydrokinetic turbine. The efficiency of the mechanism as a whole is improved also, of course, by reason of the split torque power delivery path that is made available. The direct drive torque is delivered through the auxiliary impeller and through the clutch disc assembly 188 to the sun gears while the balance of the torque is delivered from the turbine through the clutch disc assembly 200 to the ring gear 228.

Having thus described a preferred embodiment of my invention, what I claim and desire to secure by United States Letters Patent is:

1. In a power transmission mechanism, a hydrokinetic member comprising a bladed main impeller, a bladed auxiliary impeller and a turbine disposed in toroidal fluid flow relationship, a driving member connected to said main impeller, a driven member, a gear unit, said gear unit comprising two power input elements, a reaction element and a driven element, selectively engageable brake means for anchoring said reaction element to produce an underdrive speed ratio, means for connecting said driven member to said driven element, first selectively engageable clutch means for connecting together said impellers, means for drivingly connecting said turbine to one of said power input elements and second selectively engageable clutch means for connecting said auxiliary impeller to the other of said power input elements when said first clutch means is engaged to establish high speed ratio operation.

2. In a power transmission mechanism, a hydrokinetic member comprising a bladed main impeller, a bladed auxiliary impeller and a turbine disposed in toroidal fluid flow relationship in a torus circuit, a driving member connected to said main impeller, a driven member, a gear unit, said gear unit comprising two power input elements, a reaction element and a driven element, means for connecting said driven member to said driven element, first selectively engageable clutch means for connecting together said impellers, means for drivably connecting said turbine to one of said power input elements and other selectively engageable clutch means for connecting said auxiliary impeller to the other of said power input elements, said first clutch means comprising a clutch member connected to said auxiliary impeller, a first friction surface carried by said clutch member, an impeller shell surrounding said turbine and said main impeller, a second friction surface carried by said shell in close proximity to said first friction surface, radially inward portions of said shell and said clutch member defining a clutch pressure cavity that communicates with said torus circuit through the space between said friction surfaces when they are disengaged, said friction surfaces being adapted to engage when the pressure in said clutch pressure cavity is changed relative to the pressure in said torus circuit.

3. In a power transmission mechanism, a hydrokinetic member comprising a bladed main impeller, a turbine disposed in fluid flow relationship with respect to said main impeller in a common toroidal fluid flow circuit, a bladed auxiliary impeller disposed at a radially outwardly region of said circuit at the exit section of said main impeller, the geometry of the blades of said auxiliary impeller being adapted to alter the absolute fluid flow velocity vector of the fluid leaving the exit section of said main impeller, a driving member connected to said main impeller, a driven member, a gear unit, said gear unit comprising two power input elements, a reaction element and a driven element, a selectively engageable brake means for anchoring said reaction element to establish low speed ratio underdrive operation, means for connecting said driven member to said driven element, selectively engageable clutch means for connecting together said impellers, means for drivably connecting said turbine to one of said power input elements and other selectively engageable clutch means for conecting said auxiliary impeller to the other of said power input elements, said mechanism being conditioned for high speed ratio operation when both selectively engageable clutch means are engaged.

4. In a power transmission mechanism, a hydrokinetic member comprising a bladed main impeller and a turbine disposed in toroidal fluid flow relationship in a common torus circuit, a bladed auxiliary impeller situated in a radially outward region of said circuit adjacent the exit section of said main impeller, a driving member connected to said main impeller, a driven member, a gear unit, said gear unit comprising two power input elements, a reaction element and a driven element, means for connecting said driven member to said driven element, first selectively engageable clutch means for connecting together said impellers, means for drivably connecting said turbine to one of said power input elements and other selectively engageable clutch means for connecting said auxiliary impeller to the other of said power input elements, said first clutch means comprising a clutch member connected to said auxiliary impeller, a first friction surface carried by said clutch member, an impeller shell surrounding said turbine and said main impeller, a second friction surface carried by said shell in close proximity to said first friction surface, radially inward portions of said shell and said clutch member defining a clutch pressure cavity that communicates with said torus circuit through the space between said friction surfaces when they are disengaged, said friction surfaces being adapted to engage when the pressure in said clutch pressure cavity is changed relative to the pressure in said torus circuit.

5. In a power transmission mechanism, a hydrokinetic member comprising a bladed main impeller, a bladed auxiliary impeller and a turbine disposed in toroidal fluid flow relationship in a common torus circuit, said auxiliary impeller being disposed in a radially outward region of said circuit adjacent the exit section of said main impeller, a gear unit, said gear unit comprising two power input elements, a reaction element and a driven element, means for connecting said driven member to said driven element, selectively engageable clutch means for connecting together said impellers, a turbine shaft forming in part a driving connection between said turbine and one of said power input elements, a torque transfer member connected to said auxiliary impeller and extending through the radially inward region of said torus circuit, a sleeve shaft surrounding said turbine shaft, said sleeve shaft being connected to said torque transfer member, and selectively engageable clutch means for connecting said sleeve shaft to the other of said power input elements.

6. In a power transmission mechanism, a hydrokinetic member comprising a bladed main impeller, a bladed auxiliary impeller and a turbine disposed in toroidal fluid flow relationship in a common torus circuit, said auxiliary impeller being located at a radially outward region of said circuit adjacent the exit section of said main impeller, a stator situated in the radially inward region of said circuit between the exit section of said turbine and the entrance section of said main impeller, the blades of said auxiliary impeller being adapted to alter the absolute fluid flow velocity vector for the fluid discharged from the exit section of said main impeller whereby the converter characteristics can be altered, selectively engageable clutch means for connecting together said impellers, a driving member connected to said main impeller, a driven member, a gear unit, said gear unit comprising two power input elements, a reaction element and a driven element, selectively engageable brake means for anchoring said reaction element to produce underdrive forward operation, means for connecting said driven member to said driven element, a turbine shaft disposed concentrically with respect to said converter and forming in part a driving connection between said turbine and one of said power input elements, a torque transfer member connected to said auxiliary impeller and extending radially inwardly through said torus circuit, a portion of said torque transfer member being disposed between the exit section of said turbine and the entrance section of said reactor, a sleeve shaft surrounding said turbine shaft, said torque transfer member being connected to said sleeve shaft, and other selectively engageable clutch means for drivably connecting said sleeve shaft to the other of said power input elements, said mechanism being conditioned for high speed ratio direct drive operation when said brake means is released and both clutch means are applied.

7. A power transmission mechanism comprising a hydrokinetic unit having a bladed main impeller, a bladed auxiliary impeller and a turbine disposed in toroidal fluid flow relationship, a driving member connected to said main impeller, a driven member, a planetary gear unit comprising a pair of sun gears, a ring gear, compound planet members supported by a common carrier and drivably connecting said ring gear and said sun gears, first brake means for anchoring selectively a first of said sun gears, second brake means for anchoring selectively said ring gear, said carrier being connected to said driven member, first selectively engeable clutch means for connecting together said impellers, means for drivably connecting said turbine to said second sun gear and other selectively engageable clutch means for forming in part a driving connection between said auxiliary impeller and said one sun gear, said first clutch means comprising a clutch member connected to said auxiliary impeller, a first friction surface carried by said clutch member, an impeller shell surrounding said turbine and said main impeller, a second friction surface carried by said shell in close proximity to said first friction surface, radially inward portions of said shell and said clutch member defining a clutch pressure cavity that communicates with said torus circuit through the space between said friction surfaces when they are disengaged, said friction surfaces being adapted to engage when the pressure in said clutch pressure cavity is changed relative to the pressure in said torus circuit.

8. In a power transmission mechanism, a hydrokinetic unit comprising a bladed main impeller, a bladed auxiliary impeller and a turbine disposed in toroidal fluid flow relationship, a driving member connected to said main impeller, a driven member, a compound planetary gear unit, said gear unit comprising a pair of interconnected sun gears, a first planet set engageable with a first of said sun gears, a first ring gear engageable with said first planet set, a second planet set engageable with said second sun gear, a second ring gear connected with said second planet set, each planet set being supported by a carrier, the carrier for said first planet set being connected to said driven member, said second ring gear being connected to said driven member, means for anchoring the carrier for said second planet set, means for anchoring selectively said sun gears, first selectively engageable clutch means for connecting together said impellers, second selectively engageable clutch means for forming in part a torque delivery path from said turbine to said first ring gear, and third selectively engageable clutch means for forming in part a driving connection between said auxiliary impeller and said sun gears.

9. A power transmission mechanism comprising a hydrokinetic torque converter having a bladed main impeller, a bladed auxiliary impeller, a bladed turbine and a bladed reactor situated in toroidal fluid flow relationship, the auxiliary impeller being located at a radially outward region adjacent the exit section of said main impeller, a driving member connected to said main impeller, a driven member, a compound planetary gear unit comprising two sun gears, a ring gear, compound planet pinions drivably connecting said sun gears and said ring gear, said pinions being carried by a common carrier, said carrier being connected to said driven member, a turbine shaft disposed concentrically with respect to said torque converter and forming in part a driving connection between said turbine and the first sun gear, a sleeve shaft surrounding said turbine shaft, a torque transfer member connected to said auxiliary impeller and extending through said torus circuit, said torque transfer member being disposed between the turbine exit section and the reactor entrance section of said torque converter, said torque transfer member being connected to said sleeve shaft, selectively engageable clutch means for connecting together said second sun gear and said sleeve shaft, first brake means for anchoring selectively said ring gear, and second selectively engageable clutch means for connecting together said impellers whereby the operating characteristics of said mechanism can be altered to produce maximum performance conditions or high efficiency cruising conditions.

10. A torque converter transmission comprising a torque converter unit having a main impeller, an auxiliary impeller, a turbine and a stator situated in toroidal fluid flow relationship in a common circuit, a driving member connected to said main impeller, a driven member, a multiple speed planetary gear unit comprising a pair of spaced planet sets, each set comprising a sun gear, a ring gear and planet pinions drivably connecting said sun and ring gears, a separate carrier drivably supporting each planet pinion set, a carrier for a first of said gear sets being connected to said output shaft, the ring gear for the second of said gear sets being connected to said output shaft, selectively engageable brake means for anchoring the carrier for said second planetary gear set, another selectively engageable brake means for anchoring said sun gears, said sun gears being connected together for rotation in unison, a turbine shaft coaxially disposed with respect to said torque converter, said turbine being connected to said turbine shaft, a sleeve shaft surrounding said turbine shaft, a torque transfer member connected to said auxiliary impeller and extending through said torus circuit at a location between the exit section of said turbine and the entrance section of said reactor, said torque transfer member being connected to said sleeve shaft, first clutch means for connecting said turbine shaft to the ring gear of said first planet set, second clutch means for connecting said sleeve shaft to said sun gear, and third clutch means for connecting together selectively said impellers whereby the operating characteristics of said mechanism can be altered to provide selectively maximum performance operation and maximum efficiency cruising operation.

References Cited by the Examiner
UNITED STATES PATENTS

| | | | |
|---|---|---|---|
| 2,749,773 | 6/56 | Simpson | 74—688 |
| 2,846,899 | 8/58 | Bopp | 74—677 |
| 2,860,747 | 11/58 | Kelley | 74—731 |
| 2,889,715 | 6/59 | De Lorean | 74—677 |
| 3,043,161 | 7/62 | Tuck | 74—677 |
| 3,048,057 | 8/62 | Dodge | 74—677 |
| 3,055,232 | 9/62 | Dodge | 74—677 |
| 3,079,756 | 3/63 | Farrell | 60—54 |

DON A. WAITE, *Primary Examiner.*